(12) United States Patent
Daykin et al.

(10) Patent No.: US 7,243,697 B2
(45) Date of Patent: Jul. 17, 2007

(54) APPARATUS AND METHOD FOR COATING PIPES

(75) Inventors: Damian Daykin, Clitheroe (GB); Terence Cottrell, Ightenhill (GB); Adrian Kelly, Darwen (GB)

(73) Assignee: Pipeline Indusction Heat Ltd., Burnley (GB)

( * ) Notice: Subject to any disclaimer, the term of this patent is extended or adjusted under 35 U.S.C. 154(b) by 229 days.

(21) Appl. No.: 10/343,373

(22) PCT Filed: Aug. 3, 2001

(86) PCT No.: PCT/GB01/03442

§ 371 (c)(1), (2), (4) Date: Jan. 30, 2003

(87) PCT Pub. No.: WO02/11972

PCT Pub. Date: Feb. 14, 2002

(65) Prior Publication Data

US 2003/0141011 A1    Jul. 31, 2003

(30) Foreign Application Priority Data

Aug. 3, 2000  (GB) ................................ 0019030.6

(51) Int. Cl.
*B65H 81/00* (2006.01)
(52) U.S. Cl. ................... 156/392; 156/425; 156/428
(58) Field of Classification Search .......... 156/390, 156/391, 392, 428, 184, 425; 206/411
See application file for complete search history.

(56) References Cited

U.S. PATENT DOCUMENTS

| | | | | |
|---|---|---|---|---|
| 2,726,705 A | * | 12/1955 | Marx et al. .................. | 156/392 |
| 2,770,284 A | * | 11/1956 | Myrick ......................... | 156/392 |
| 3,403,869 A | * | 10/1968 | Marchisen et al. ...... | 242/597.8 |
| 3,470,057 A | | 9/1969 | Stuart Jr. et al. | |
| 3,508,998 A | * | 4/1970 | Bilbrey ........................ | 156/457 |
| 3,616,072 A | * | 10/1971 | Bostrom ...................... | 156/468 |
| 4,008,114 A | * | 2/1977 | Lindsey ....................... | 156/392 |
| 4,010,054 A | * | 3/1977 | Bradt .......................... | 156/173 |
| 4,012,273 A | * | 3/1977 | Inka ............................ | 156/490 |
| 4,058,427 A | * | 11/1977 | Wilson ........................ | 156/392 |
| 4,264,398 A | * | 4/1981 | Pruitt .......................... | 156/468 |
| 4,322,262 A | * | 3/1982 | Cottam ........................ | 156/392 |
| 4,426,834 A | * | 1/1984 | Dokmo et al. ............ | 242/441.3 |
| 4,961,798 A | * | 10/1990 | Hart et al. .................... | 156/86 |
| 5,046,558 A | * | 9/1991 | Koster ......................... | 166/243 |
| 5,491,880 A | | 2/1996 | Labiche | |
| 5,643,382 A | | 7/1997 | Delimoy et al. | |
| 5,735,997 A | | 4/1998 | Reinders | |
| 5,954,918 A | * | 9/1999 | Belivakici ................... | 156/468 |

\* cited by examiner

*Primary Examiner*—Jeff H. Aftergut
(74) *Attorney, Agent, or Firm*—Barlow, Josephs & Holmes, Ltd.

(57) ABSTRACT

Apparatus for coating pipes includes means for applying a sheet material 32,33,34, to a pipe 2 and means for heating 23,31 the sheet material and/or pipe. The means for heating may be operative to heat the sheet material during its application to the pipe. The means for heating may comprise a means for directing hot air towards the pipe and/or sheet material. The sheet material may be disposed on reels housed in canisters 22 that are releasably mounted on the apparatus.

12 Claims, 4 Drawing Sheets

APPARATUS AND METHOD FOR COATING PIPES

BACKGROUND OF THE INVENTION

The present invention relates to an apparatus and method for coating pipes and particularly, but not exclusively, girth welds on oil and gas pipelines.

Oil and gas pipelines are usually formed from many lengths of externally coated steel pipe welded together. The pipes are coated to prevent corrosion. They are usually coated at a factory remote from the site where they are to be laid. This is generally more cost effective than coating them on site. At the factory a coating is applied to the outside of the pipes leaving a short length uncoated at each end. This is necessary to enable the pipes to be welded together end-to-end on site to form a pipeline. Each resulting girth weld and adjacent uncoated region of the pipe must be coated before the pipeline is laid. This coating is known as the field joint coating. Ideally, the properties of the field joint coating should match those of the factory applied coating applied to the remainder of the pipes.

In one known arrangement the factory applied coating comprises polypropylene and the field joint coating is formed by polypropylene tape wound helically over the field joint area and factory applied coating adjacent the field joint area. Each turn of the tape overlaps either part of the factory applied coating or a previous layer or layers of tape by a predetermined amount.

A known method of applying a polypropylene tape field joint includes the following steps. The surface of the factory applied coating which will be overlapped by tape is cleaned and masked. The field joint area is then abrasive blast cleaned and induction heated. A layer of fusion bonded epoxy powder is applied to the field joint area, followed by a layer of polypropylene powder. The heat in the pipe causes the epoxy powder to bond to the pipe, the polypropylene subsequently bonds with the epoxy as it melts and flows to cover the surface of the field joint. The masking on the adjacent factory applied coating is now removed. The surface of the factory applied coating will now have been heated by conduction of heat through the coating from the pipe, but not so much as it melts. A layer of molten polypropylene is then applied to the surface of the factory coating to be overlapped by tape using a flame spraying process.

Polypropylene tape is now wrapped helically across the field joint area and adjacent factory applied coating. Residual heat in the pipe and factory applied coating from induction heating and subsequent flame spraying causes the surface of the polypropylene tape brought into contact with the pipe or factory applied coating to melt so that the tape becomes welded to the pipe or coating on cooling. Bonding of overlapping layers of tape together occurs through conduction of residual heat in the pipe through an underlying layer of tape to an overlying layer of tape sufficient to cause the abutting surfaces of the tape layers to melt. Bonding of layers of tape may also be facilitated by the subsequent external application of heat to the tape using a gas flame.

A problem with this existing method is that heating of the factory applied coating and molten polypropylene bonded thereto during the flame spraying is difficult to control. The margin between insufficient heating, leading to poor bonding between factory applied coating and tape, and overheating, causing burning of the factory applied coating or applied molten polypropylene which also adversely affects bonding with tape, is very narrow. In practice it is difficult to achieve consistently good bonding.

Another problem arises because the polypropylene applied to the factory coating remains molten for a limited period only. If there is too great a delay before application of tape the polypropylene can begin to solidify making it unlikely that tape will bond properly to it. This can happen, for example, where two turns of tape are required to coat the factory applied coating and the polypropylene solidifies between application of the two turns, and where the factory coating adjacent one side of a field joint is coated with tape before that at the opposite side of the joint.

Another problem is poor bonding between layers of tape. Bonding occurs through conduction of residual heat from the pipe and/or application of heat externally using a gas flame. Application of external heat is, in practice, largely ineffective in heating up a thickness of tape and it can take a considerable amount of time for sufficient heat to cause bonding to be conducted through layers of tape from the pipe itself. As the field joint coating increases in thickness there becomes a point where sufficient heat to cause satisfactory bonding cannot be conducted from the pipe. Further, because it is often necessary to force quench a field joint to solidify the polypropylene coating in order for it to withstand mechanical loading, for example from pipe rollers, and in many instances offshore a finished field joint is immersed in the sea within two or three minutes of application, regardless of its thickness a joint is often cooled before bonding between tape layers is complete. Also, the application of external heat using a gas flame despite being largely ineffective is also imprecise and can easily result in burning or complete melting of the outside of the coating, both of which are undesirable. As interlayer bonding and adhesion to the factory coating cannot be verified other than by destructive testing there can be little confidence in the integrity of a finished field joint coating.

SUMMARY OF THE INVENTION

The present invention seeks to overcome, or at least mitigate, the abovementioned problems.

According to a first aspect of the present invention there is provided apparatus for coating pipes comprising means for applying a sheet material to a pipe, means for heating the sheet material and/or pipe and a releasably mounted canister housing a reel for supplying sheet material in the form of a tape which may be withdrawn from the canister.

The means for heating the sheet material and/or pipe is preferably operative to heat the sheet material and/or pipe during application of the sheet material to the pipe. Provision of means for heating enables the surface of a pipe, either coated or uncoated, and/or sheet material being applied to the pipe to be brought to a sufficient temperature to ensure good bonding of the sheet material and pipe on first application obviating the need for post application heating and increasing the integrity of an applied coating.

Housing reels in canisters helps to preserve the temperature of preheated reels. The canisters may include means for heating, operative to heat a reel disposed therein.

According to a second aspect of the present invention there is provided a method for coating a pipe by application of a sheet material including the steps of preheating the sheet material using a first heating means prior to application of the sheet material to the pipe, and heating the pipe and/or sheet material using a second heating means during the application of the sheet material to the pipe.

The pipe and/or sheet material is preferably heated with hot air and the apparatus preferably includes means for directing hot air towards the pipe and/or sheet material. The use of hot air, of which it is possible to control the temperature, reduces the risk of burning a coating compared with the use of a gas flame.

The sheet material may be preheated in an oven. The sheet material is preferably a tape.

The apparatus is preferably arranged to apply tape to a pipe in a helical pattern. The apparatus preferably includes means for tensioning tape as it is applied to the pipe and means for urging tape onto the pipe. Both means may comprise rollers. The apparatus preferably includes a stator and a rotor, rotatably mounted on the stator for rotation around the periphery of a pipe. The apparatus also preferably comprises means to move at least part of the rotor longitudinally along the pipe. The means to move at least part of the rotor longitudinally along the pipe may be driven by the rotor, more particularly by relative movement of the rotor and stator. This drive can preferably be disengaged to allow movement of the means to move at least part of the rotor longitudinally along the pipe independently of relative rotation of the stator and rotor. One or more tape reels may preferably be releasably mounted on the rotor. The means for heating, for example hot air blowers, is preferably also mounted on the rotor. The stator and rotor preferably comprise an electrical contact arrangement to supply electrical power to the means for heating which permits continuous relative rotation of the rotor and stator through an unlimited number of turns. The electrical contact arrangement may comprise one or more electrical slip rings mounted on either the stator or rotor and one or more associated electrical brushes mounted on the other of the stator or rotor.

Both the stator and rotor preferably comprise rings formed from two or more pivotally connected components so that they may be opened for mounting and demounting on a pipeline.

In another arrangement the stator and/or rotor is of a horseshoe shape. In another arrangement the apparatus comprises a body arranged to be movably mounted on a pipe, in particular to be mounted for rotation about a pipe.

The apparatus and method according to the invention enable rapid and reliable application of a field joint coating using tape such as polypropylene tape. Provision for heating during application of tape enables the surface to which the tape is applied and/or the tape itself to be heated sufficiently to form an effective bond. The need for post application heating or a lengthy delay to allow the coating to be heat soaked from residual heat in the pipe is overcome. The time required to apply a coating is therefore also reduced and while this is always advantageous it is particularly so where offshore pipelines are concerned as quenching of the coating by immersion in the sea will not adversely affect the integrity of the coating.

BRIEF DESCRIPTION OF THE DRAWING FIGURES

In order that the invention may be more clearly understood an embodiment thereof will now be described by way of example with reference to the accompanying drawings of which:

DETAILED DESCRIPTION OF THE PREFERRED EMBODIMENTS

Figure 1:
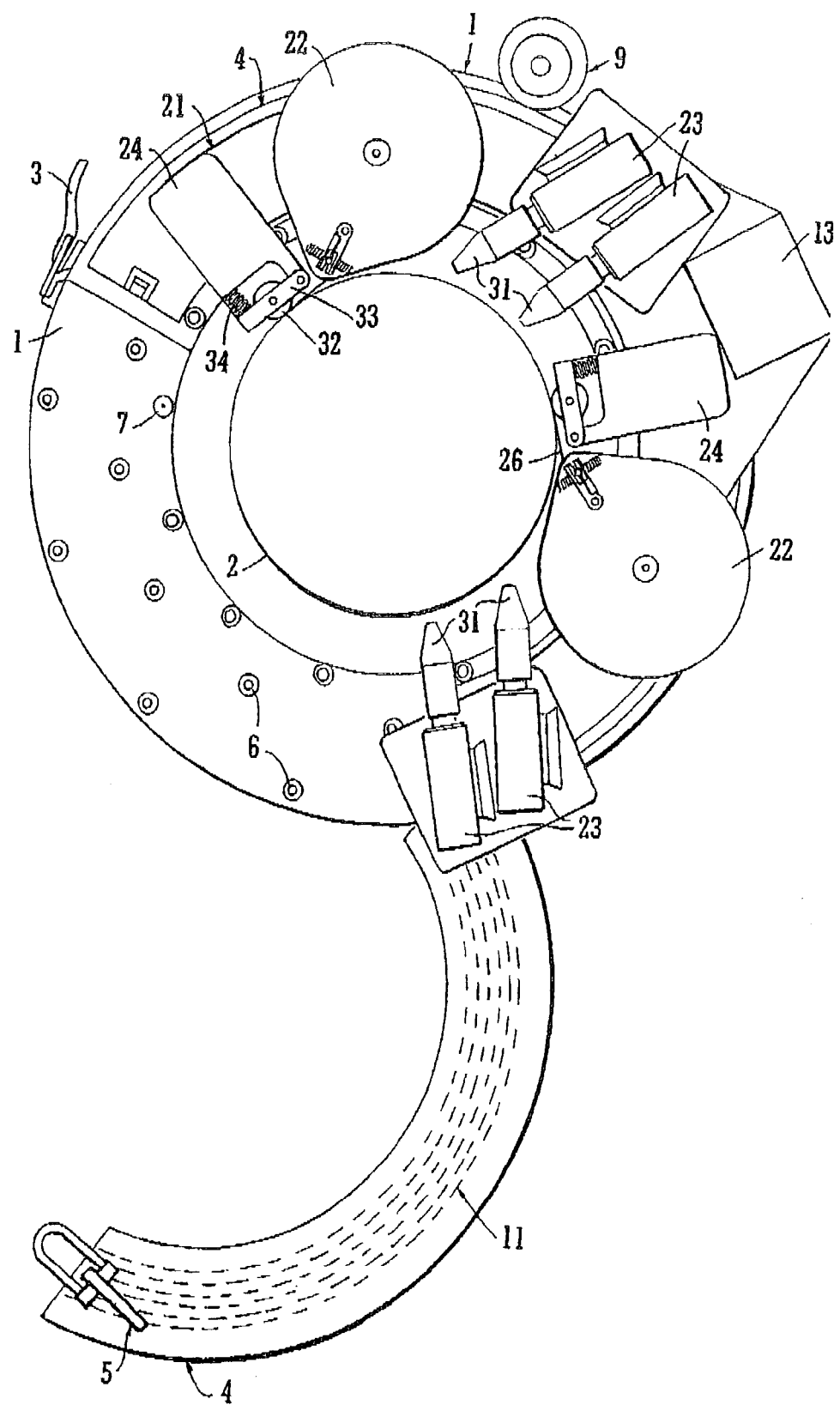
FIG. 1 is an end view of apparatus according to the invention mounted on a pipeline.
Figure 2:
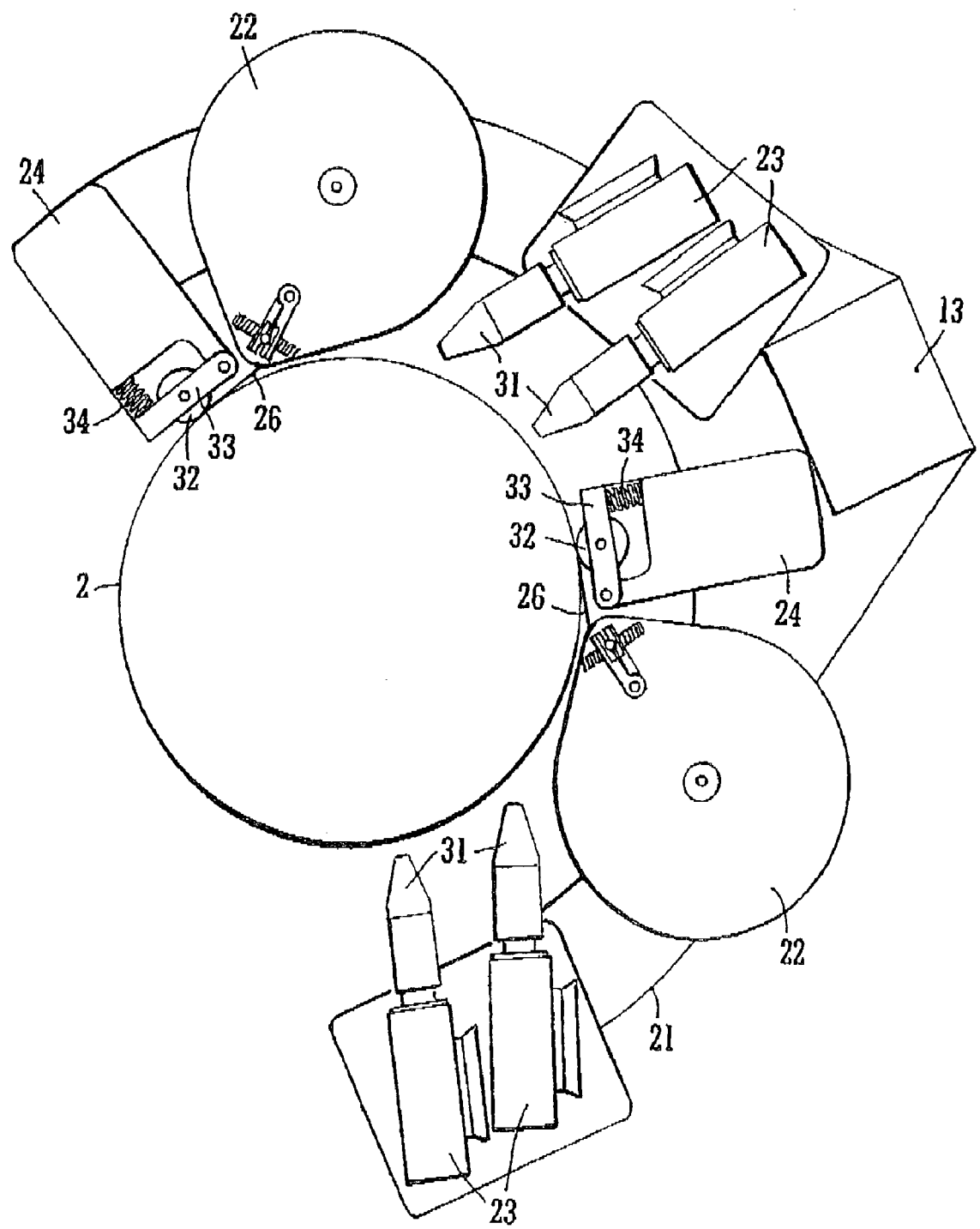
FIG. 2 is an enlarged end view of part of the apparatus of FIG. 1 mounted on a pipeline.
Figure 3:
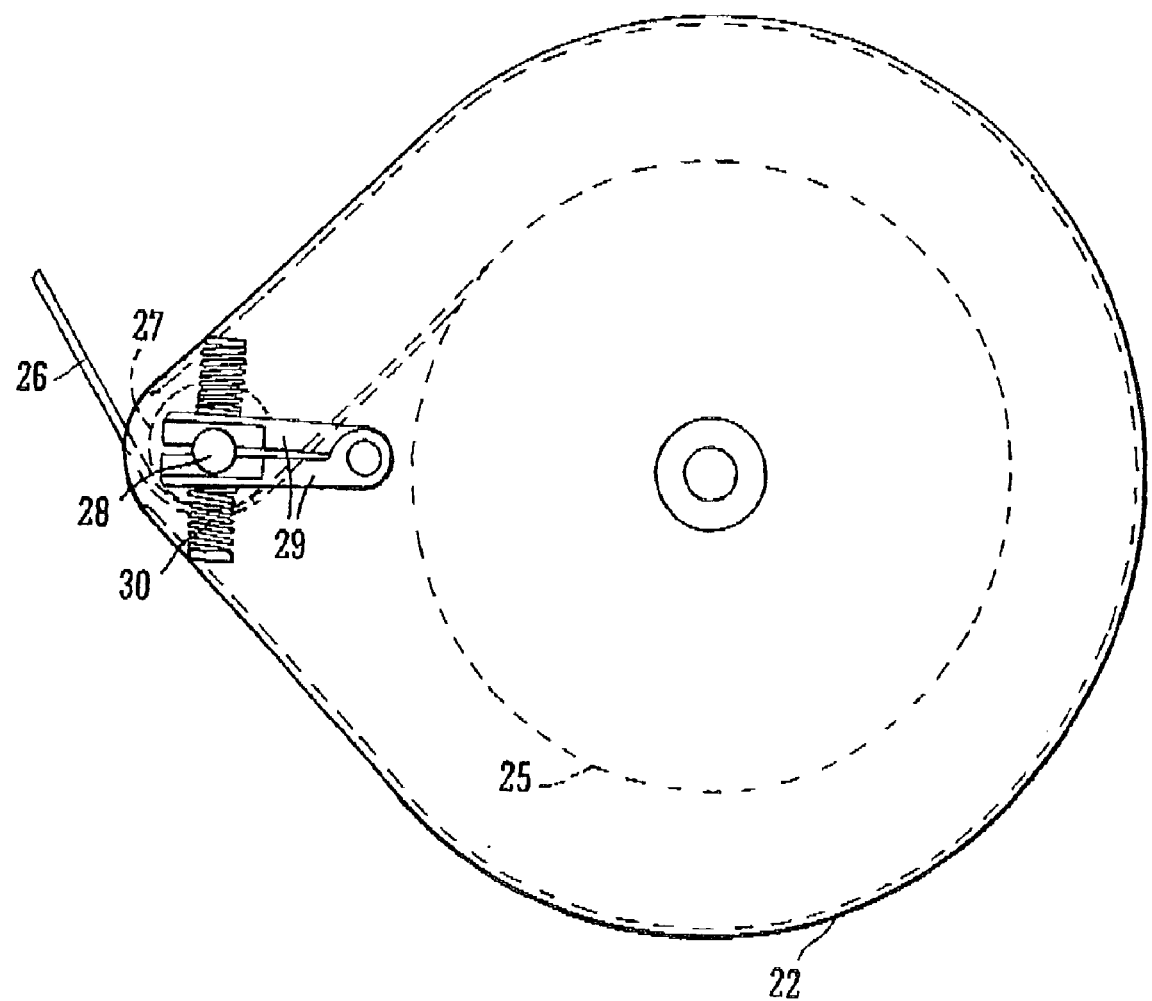
FIG. 3 is an enlarged view of a reel canister of the apparatus of FIG. 1 with some internal detail shown with broken lines.
Figure 4:
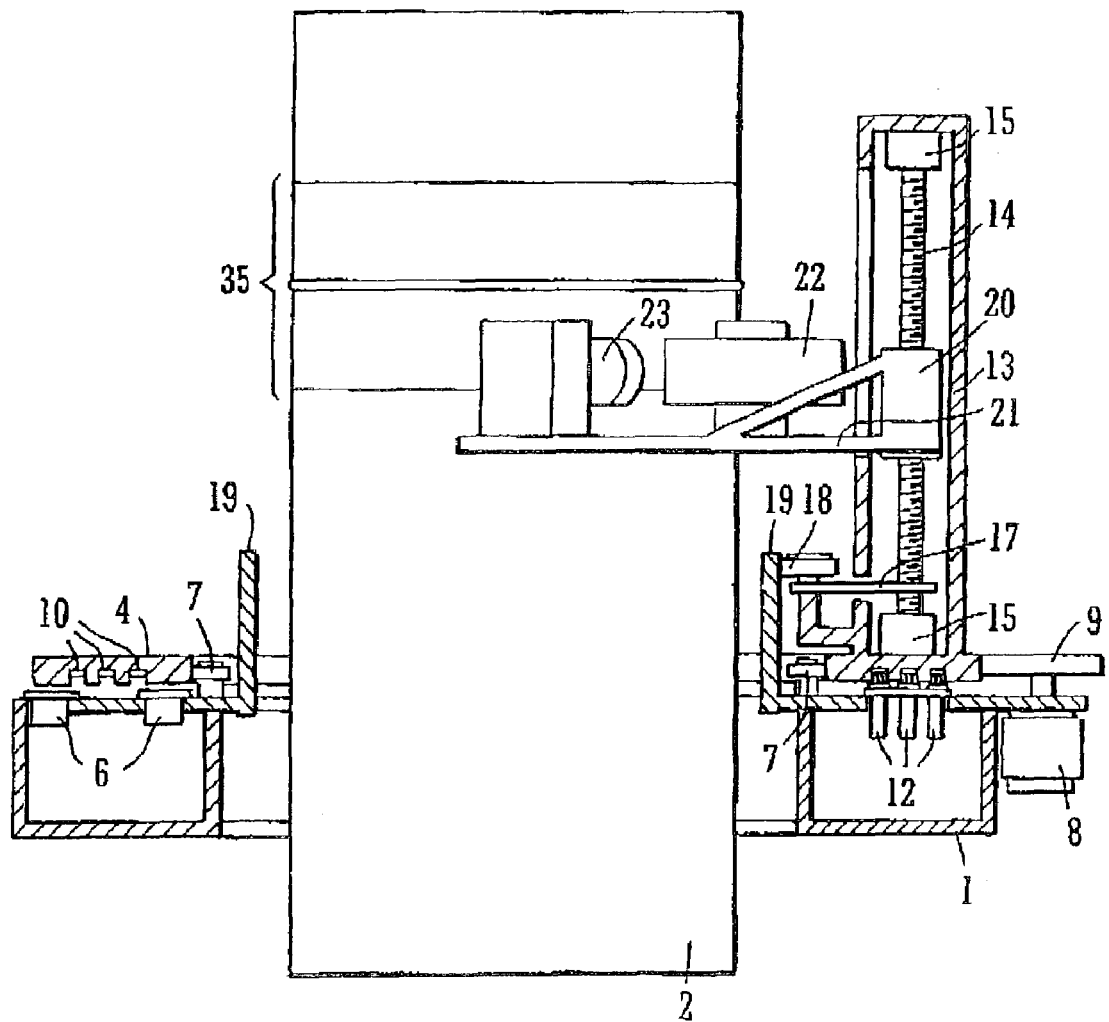
FIG. 4 is a side view of the apparatus of FIG. 1 mounted on an upright pipeline.

The drawings show apparatus for applying a tape, particularly a polypropylene tape, to the field joint of a pipeline. The illustrated apparatus is primarily intended for use on an upright pipe such as the end of an offshore pipeline being laid using the J-lay technique. In this arrangement short lengths of pipe are welded together to form a pipeline and the field joints coated immediately prior to immersion of the pipeline into the sea. Rapid application of high integrity field joint coatings is therefore necessary.

Referring to the drawings the apparatus comprises a fixed ring 1 formed from two pivotally connected parts which may be opened to allow the ring 1 to be placed around and removed from a pipeline 2. When placed around a pipeline 2 the two parts of the ring are fastened by a releasable latch 3. In use the fixed ring 1 is mounted on a track guided wheeled carriage (not shown) which enables the fixed ring 1 to be moved radially relative to a pipe to be coated.

A rotating ring 4, also formed from two pivotally connected components connectable by a releasable latch 5, is mounted on the fixed ring 1 for rotation relative thereto. The rotating ring 4 is supported on ball rollers 6 disposed on the surface of the fixed ring 1. The rotating ring 4 is also constrained radially relative to the fixed ring 1 by guide wheels 7 mounted on the fixed ring 1 and arranged to run against the inside of the rotating ring 4.

A drive motor 8 mounted on the fixed ring 1 drives a drive wheel 9 which is in driving contact with the periphery of the rotating ring 4. This enables the rotating ring 4 to be rotated relative to the fixed ring 1.

The surface of the rotating ring 4 facing the fixed ring 1 includes a number of electrical contact slip rings 10, the path of which is indicated by broken lines 11 in FIG. 1. The facing surface of the fixed ring includes a number of electrical contact brushes 12 which are urged into sliding contact with the slip rings 11. The purpose of the slip ring and brush arrangement is described below.

Extending axially from the rotating ring is a support tower 13 housing a lead screw 14 mounted between bearings 15. The lead screw 14 is driven by a drive belt 17. The belt 17 is driven by a drive wheel 18 which is, in turn, driven by a cylindrical portion 19 of the fixed ring 1. The apparatus is arranged so that as the rotating ring 4 is driven relative to the fixed ring 1 this causes the lead screw 14 to rotate. The drive wheel 18 may be moved radially of the cylindrical portion 19 of the fixed ring 1 so as to move the wheel into and out of driving engagement with the cylindrical portion 19. This allows the lead screw 14 to be rotated independently of rotation of the rotating ring 4 relative to the fixed ring.

The lead screw 14 and support tower 13 support a drive block 20, threadedly engaged with the lead screw 14 so that it advances along the lead screw 14 in response to rotation thereof.

A support arm 21 is mounted on the drive block 20 and extends in an arc from opposite sides thereof. Disposed on the support arm 21 are two mountings for supporting canisters, two pairs of hot air blowers 23 and two pressure roller assemblies 24.

Each canister 22 houses a reel 25 of polypropylene tape 26, and includes a tension roller assembly. This comprises a silicone rubber roller 27 rigidly mounted on a shaft 28 supported between two pivotally connected arms 29 resiliently urged together by springs 30. The arms 29 act as a brake on the roller 27, increasing the force required to pull tape 26 out of the canister 22 over the roller 27 thereby ensuring that a desired tension can be maintained in the tape 26 as it is withdrawn from the canister.

Each hot air blower 23 includes a nozzle 31 for directing hot air towards the surface of a pipeline 2 on which the apparatus is mounted or towards both the surface of the pipeline 2 and of tape 26 withdrawn from one of the canisters 22. The hot air blowers are electrically operated. Electrical current is supplied to the blowers via the brushes 12 and slip rings 10. The blowers 23 supply air at a temperature of about 600° C.

Each pressure roller assembly 24 comprises a silicone rubber roller 32 rotatably mounted on a pivotally supported arm 33 resiliently urged radially inwardly of the support arm 21 by a spring 34 so that, in use, the surface of the roller 32 is urged against the surface of a pipeline 2 on which the apparatus is mounted.

A coating is applied to the field joint region 35 of a pipeline 2 using the apparatus as follows. First, the field joint region 35 and factory coating adjacent the field joint region 35 is prepared by cleaning, induction heating of the pipeline and application of epoxy and polypropylene powders to the heated field joint region 35. Next, a canister 22 or canisters of tape 26 which has/have been heated to a predetermined temperature is/are mounted on the support arm 21 of the apparatus. The fixed and rotating rings 1,4 are now placed around the pipeline, closed and latched. The apparatus is positioned so that the tape canister(s) 22 partially overlap the factory applied coating adjacent the field joint area with the drive block 16 disposed at one end of its travel along lead screw 14.

A length of tape 26 is withdrawn from each canister 22 over the tension roller 27, and brought into contact with the surface of the pipeline 2, passing under the pressure roller 32.

The hot air blowers 23 are now started (alternatively they could have already been running), followed by the drive motor 8. This causes the rotating ring 4 to rotate around the pipeline 2 and the drive block 20 to advance along the drive screw 14 so that the tape is applied to the surface of the pipeline in a helical pattern with a degree of overlap, typically each fresh layer of tape overlaps the previous layer by about two thirds of its width. The hot air blowers 23 heat the surface of the pipeline 2 and, to some extent, the tape 26 immediately prior to application of the tape 26 to the pipeline 2. This ensures that the surface of both the tape 26 and pipeline (coated or not) are sufficiently hot to form an effective bond.

The tape 27 is dispensed at a predetermined tension which is controlled by the tension roller in the canister. Immediately after the tape contacts the pipe surface it is pressed against that surface by a pressure roller 32.

The first portion of tape is applied to a surface which has not been preheated and therefore does not bond to the surface. The tape is subsequently peeled from the surface until the point at which bonding starts is found. The tape is cut at this point and removed.

When the field joint area 35 has been wrapped with tape 26 this is cut and the apparatus removed from the pipe. The coating is now complete, no further heating is necessary as each tape/pipe, tape/coating and tape/tape interface has been heated prior to being brought together, there is no need to wait for heat to pass through the coating from inside (from the pipe) or externally. This saves time and leads to an improved coating.

The speed of operation of the apparatus may be varied by varying the speed of the drive motor 8. Slowing the machine allows for more heating of the pipe/tape prior to application of tape. Typically the apparatus will be run slowly when applying tape over the factory coating, but more quickly when applying tape over the heated pipe for the first time. The apparatus would be run more slowly for application of a second or subsequent layer of tape, because of the need to heat the previous layer of tape sufficiently to effect a satisfactory bond.

Following application of tape to a field joint the drive motor 8 and hot air blowers are stopped, the fixed 1 and rotating 4 rings opened and the apparatus moved radially away from the pipeline. Drive wheel 18 is then disengaged from the cylindrical portion 19 of the fixed ring 1 and the lead screw 14 rotated to return the drive block 20 and hence support arm 21 back to its original position ready to coat another field joint.

In an alternative embodiment the apparatus could be adapted to be run in reverse so that tape can be applied to a field joint irrespective of the direction of travel of the support arm relative to the fixed and rotating rings 1,4. This might be achieved, for example, by providing tape canisters and pressure roller assemblies for dispensing tape in both directions of relative rotation of the fixed and rotating rings 1,4.

The above embodiment is described by way of example only. Many variations are possible without departing from the invention.

The invention claimed is:

1. Apparatus for coating pipes comprising:
   means for applying a sheet material to a pipe;
   first means for pre-heating the sheet material prior to applying the sheet material to the pipe;
   a canister housing a reel for supplying sheet material in the form of a tape which may be withdrawn from the canister, said canister being configured and arranged to releasably couple to said apparatus itself; and
   second means for heating the pipe as the sheet material is being applied to the pipe.

2. Apparatus as claimed in claim 1, wherein the second means for heating is operative to heat the sheet material and pipe during application of the sheet material to the pipe.

3. Apparatus as claimed in claim 1, wherein the first means and the second means for heating includes means for directing hot air towards the pipe and sheet material.

4. Apparatus as claimed in claim 1 for applying sheet material in the form of a tape to a pipe in a helical pattern further including
   means for tensioning the tape as it is applied to the pipe, said means for tensioning the tape included in said canister; and
   means for urging the tape onto the pipe.

5. Apparatus as claimed in claim 1 for applying sheet material in the form of a tape to a pipe in a helical pattern further including
   means for tensioning the tape as it is applied to the pipe, said means for tensioning the tape included in said canister,
   means for urging the tape onto the pipe,
   a stator for mounting on a pipe and
   a rotor, rotatably mounted on the stator for rotation around the periphery of the pipe.

6. Apparatus as claimed in claim 1 for applying sheet material in the form of a tape to a pipe in a helical pattern further including
- means for tensioning the tape as it is applied to the pipe, said means for tensioning the tape included in said canister,
- means for urging the tape onto the pipe,
- a stator for mounting on a pipe,
- a rotor rotatably mounted on the stator for rotation around the periphery of the pipe, and drive means to move at least part of the rotor longitudinally along the pipe.

7. Apparatus as claimed in claim 1 for applying sheet material in the form of a tape to a pipe in a helical pattern further including
- means for tensioning the tape as it is applied to the pipe, said means for tensioning the tape included in said canister,
- means for urging the tape onto the pipe,
- a stator for mounting on a pipe,
- a rotor rotatably mounted on the stator for rotation around the periphery of the pipe, and
- drive means to move at least part of the rotor longitudinally along the pipe, wherein the drive means is driven by relative movement of the rotor and stator.

8. Apparatus as claimed in claim 1 for applying sheet material in the form of a tape to a pipe in a helical pattern further including
- means for tensioning the tape as it is applied to the pipe, said means for tensioning the tape included in said canister,
- means for urging the tape onto the pipe,
- a stator for mounting on a pipe,
- a rotor rotatably mounted on the stator for rotation around the periphery of the pipe, and
- drive means to move at least part of the rotor longitudinally along the pipe, wherein the drive means is driven by relative movement of the rotor and stator, and the drive means can be disengaged to allow movement of the at least part of the rotor longitudinally along the pipe independently of relative rotation of the stator and rotor.

9. Apparatus as claimed in claim 1 for applying sheet material in the form of a tape to a pipe in a helical pattern further including
- means for tensioning the tape as it is applied to the pipe, said means for tensioning the tape included in said canister,
- means for urging the tape onto the pipe,
- a stator for mounting on a pipe and
- a rotor, rotatably mounted on the stator for rotation around the periphery of the pipe, wherein the means for heating is mounted on the rotor.

10. Apparatus as claimed in claim 1 for applying sheet material in the form of a tape to a pipe in a helical pattern further including
- means for tensioning the tape as it is applied to the pipe, said means for tensioning the tape included in said canister,
- means for urging the tape onto the pipe,
- a stator for mounting on a pipe and
- a rotor rotatably mounted on the stator for rotation around the periphery of the pipe, wherein the rotor comprises means for releasably supporting a reel of tape.

11. Apparatus as claimed in claim 1 for applying sheet material in the form of a tape to a pipe in a helical pattern further including
- means for tensioning the tape as it is applied to the pipe, said means for tensioning the tape included in said canister,
- means for urging the tape onto the pipe,
- a stator for mounting on a pipe and
- a rotor, rotatably mounted on the stator for rotation around the periphery of the pipe, wherein the stator and/or rotor comprise rings formed from two or more pivotally connected components.

12. Apparatus as claimed in claim 1, wherein the canister includes the second means for heating and is operative to heat a reel of tape disposed therein.

* * * * *